United States Patent
Griggs et al.

(10) Patent No.: US 7,239,056 B1
(45) Date of Patent: Jul. 3, 2007

(54) LOW SPEED CANNED MOTOR

(75) Inventors: Paul E Griggs, Baton Rouge, LA (US);
Dale B Andrews, Derry, NH (US)

(73) Assignee: Lawrence Pumps, Inc., Lawrence, MA (US)

(*) Notice: Subject to any disclaimer, the term of this patent is extended or adjusted under 35 U.S.C. 154(b) by 202 days.

(21) Appl. No.: 10/871,236

(22) Filed: Jun. 18, 2004

Related U.S. Application Data

(63) Continuation-in-part of application No. 10/093,899, filed on Mar. 8, 2002, now Pat. No. 6,759,774.

(60) Provisional application No. 60/274,282, filed on Mar. 8, 2001.

(51) Int. Cl.
*H02K 5/10* (2006.01)
(52) U.S. Cl. .......................... 310/87; 310/90
(58) Field of Classification Search ............ 310/87–89, 310/90, 54; 417/423.12
See application file for complete search history.

(56) References Cited

U.S. PATENT DOCUMENTS

| | | | |
|---|---|---|---|
| 3,135,884 A * | 6/1964 | Luenberger | 310/87 |
| 3,742,595 A * | 7/1973 | Lykes | 29/596 |
| 3,918,852 A * | 11/1975 | Carter | 417/423.12 |
| 4,198,191 A * | 4/1980 | Pierce | 417/369 |
| 4,433,261 A * | 2/1984 | Nashiki et al. | 310/156.28 |
| 4,990,068 A * | 2/1991 | Zhong et al. | 417/423.8 |
| 5,009,578 A * | 4/1991 | Hyland | 417/365 |
| 5,101,128 A * | 3/1992 | Veronesi et al. | 310/54 |
| 5,129,795 A * | 7/1992 | Hyland | 417/423.12 |
| 5,148,909 A * | 9/1992 | Becker et al. | 198/780 |
| 5,385,454 A * | 1/1995 | Kobayashi et al. | 417/423.12 |

(Continued)

FOREIGN PATENT DOCUMENTS

JP  2000009077 A *  1/2000

(Continued)

OTHER PUBLICATIONS

McAnn, L. Thomas, "H-Coal Pilot Plant —Topical Report —Rotating Equipment Test Program (with Separate Proprietary Appendix)", Jun. 1983, pp. 1-4, Ashland Synthetic Fuels, Inc., Ashland, KY (under contract with US Dept of Energy —DE-AC05-76ET1014.

*Primary Examiner*—Thanh Lam
(74) *Attorney, Agent, or Firm*—Maine & Asmus

(57) ABSTRACT

A canned motor has an $L^3/D^4$ ratio of less than 50, with one bearing on one end of the rotor assembly configured to resist longitudinal displacement of the rotor as by an axial shaft load, and another bearing on the other end of the rotor assembly configured to allow limited longitudinal displacement of the rotor assembly within the bearing as from thermal expansion, lengthwise adjustment or pressure from an axial shaft load. The rotor assembly may include a center shaft coaxially extended through a hollow shaft, with rotor windings mounted on the hollow shaft, with the first bearing positioned on one end of the hollow shaft and the second bearing mounted on the second hollow shaft end. A cap and nut assembly on the second hollow shaft end, into which the rotor shaft end is threaded, provides for adjusting the effective rotor shaft length protruding from the motor, and for replacement of the rotor shaft within the hollow shaft without removing the rotor assembly from motor.

15 Claims, 9 Drawing Sheets

U.S. PATENT DOCUMENTS 5,567,133 A * 10/1996 Kobaybashi et al. ..... 417/423.7
5,648,694 A *  7/1997 Kobayashi et al. ........... 310/87
6,060,805 A *  5/2000 Ohtake et al. ................ 310/87
6,759,774 B1 *  7/2004 Griggs ........................ 310/87

FOREIGN PATENT DOCUMENTS

JP            2000316248 A  * 11/2000

* cited by examiner

ISOFLOW CANNED MOTOR UNIT EXPLODED

ROTOR ASSEMBLY EXPLODED

STATOR ASSEMBLY EXPLODED

BEARING HOUSINGS EXPLODED

LOW SPEED CANNED MOTOR

RELATED APPLICATIONS

This application is a continuation-in-part of U.S. application Ser. No. 10/093,899, filed Mar. 8, 2002, now U.S. Pat. No. 6,759,774, which claims benefit of U.S. Provisional Applications No. 60/274,282, filed Mar. 8, 2001. Each of these applications is herein incorporated in its entirety by reference.

FIELD OF THE INVENTION

The present invention relates to electric motors which are known in the art as canned or sealless motors as are often used for submerged applications such as to power submergible pumps, and in particular to improvements in such canned motors.

BACKGROUND OF THE INVENTION

Canned motors are well known in the art and an example of such motors may be seen in U.S. Pat. No. 4,990,068 which is incorporated herein by reference. The term "canned" is derived from the fact that a first metal cylinder or "can" surrounds the rotor (the "rotor can") while a second metal cylinder fits between the rotor can and the stator (the "stator can"). A small gap, approximately $30/1000$ of an inch, is created between the rotor and stator cans which allow cooling fluid to flow between the cans and extract heat from the motor. Additionally, the same fluid typically passes over the rotor shaft bearings on each end of the motor in order to cool and lubricate those bearings.

Canned motors are widely used to power pumps, mixers and the like in the petro-chemical industry. In such an arrangement, the pump or mixer is typically connected directly to the motor body. This eliminates the need for a separate, external seal at the point where the motor shaft engages the pump. Quite often, the fluid being pumped or mixed is also used as the cooling fluid. Because the fluid is often corrosive, sleeve bearings are a typically used in such canned motors since this type of bearing tends to be more resistant to corrosion. However, an inherent disadvantage of sleeve bearings is that they should be rotating at higher motor speeds (e.g. 1800 or 3600 rpm) in order for an effective film of lubricating fluid to form between the sleeves of the bearing. Therefore, at lower motor speeds (e.g. 1200, 900, 600 rpm), sleeve bearings are quickly damaged by failure of effective lubrication. However, the net positive suction head available ($NPSH_A$) in many petro-chemical applications is on the order of 5 to 10 feet of head. Pumps operating at lower motor speeds typically have a lower net positive suction head required ($NPSH_R$) and are more likely to meet the general pump design requirement of the $NPSH_A$ being greater than the $NPSH_R$.

An alternative to using canned motor pumps is to use conventional air gap motors (which can effectively operate at lower motor speeds) attached to a separate pump. A common example of this pump arrangement is vertical cantilever styled packed pump, as manufactured by, Lawrence Pumps Inc., Lawrence, Mass. However, this pumping arrangement, as alluded to above, requires the use of a separate seal where the motor shaft engages the pump. Several factors may lead to the failure of these seals which could allow the escape of potentially explosive or toxic materials being pumped.

Furthermore, prior art motor/pump assemblies (whether canned motors or air gap motors) typically have an $L^3/D^4$ ratio of 50 or more. The $L^3/D^4$ ratio is defined as the overhung shaft length (L) between the axial centerline of the bearing closest to the impeller (inboard bearing) and the axial centerline of the impeller cubed ($L^3$) divided by the shaft diameter (D), defined as the diameter of the smallest cross section within length L exclusive of the impeller mounting surface, raised to the fourth power ($D^4$). However, the larger the $L^3/D^4$ ratio, the more shaft deflection which is likely to occur. Such shaft deflection may be generated by any unexpected operating conditions such as pump cavitations, closed suction or discharge valves, or improper operating conditions i.e. improper pump selection. The greater this shaft deflection, the greater the wear on seals and bearings in the system. It would be desirable to have an $L^3/D^4$ ratio considerably less than 50.

Another disadvantage of prior art canned motors is their limited axial load thrust capacity and radial load capacity. For example, a 50 or 75 horsepower canned motor with a conventional double acting thrust bearing only has a thrust capacity of approximately 1100 lbs. at 1800 or 3600 rpm. This thrust capacity is considerably reduced if the motor runs at lower speeds. Likewise, a 4.5" diameter, 3" long sleeve bearing only has a radial load capacity of 2000 to 3000 lbs. (depending on the fluid used for lubrication). There is a need in the art for canned motors with considerably higher thrust and radial load capacities, both at higher and lower motor speeds.

A further disadvantage of prior art canned motor pumps is that the rotors are axially constrained by the design such that no provision is available for the user to adjust internal axial clearances for wear compensation other than through additional machining of parts, or the addition of shims between mating parts, which modifies the overall length of the assembled components. Both of these methods are costly and time consuming in that they require at least one additional assembly and disassembly of the machine to establish proper operating clearances. Therefore, there also exists a need for a means to adjust the axial position of the rotor, without modification to existing components and without the use of shims, which can be performed as part of a single assembly process.

A further disadvantage of canned motors is that electrical rotor is usually permanently mounted on the rotor shaft. Damage to the rotor shaft sometimes necessitates replacement of the entire rotor include the rotor core, rotor can, and rotor bearings, even though these parts are may not be damaged themselves. This is a costly event. Therefore it would be desirable to be able to replace the rotor shaft without having to replace the rotor core, rotor can, or bearings.

SUMMARY OF THE INVENTION

Aspects of the invention are explained thusly: A canned motor has an $L^3/D^4$ ratio of less than 50, with one bearing on one end of the rotor assembly configured to resist longitudinal displacement of the rotor as by an axial shaft load, and another bearing on the other end of the rotor assembly configured to allow limited longitudinal displacement of the rotor assembly within the bearing as from thermal expansion, lengthwise adjustment or pressure from an axial shaft load. The rotor assembly may include a center shaft coaxially extended through a hollow shaft, with rotor windings mounted on the hollow shaft, with the first bearing positioned on one end of the hollow shaft and the second bearing mounted on the second hollow shaft end. A cap and nut assembly on the second hollow shaft end, into which the rotor shaft end is threaded, provides for adjusting the effective rotor shaft length protruding from the motor, and for replacement of the rotor shaft within the hollow shaft without removing the rotor assembly from motor.

The invention may be further summarized by reference to several embodiments. One embodiment of the present invention provides a canned motor comprising a rotor assembly, a stator assembly, and an isolating can separating the rotor assembly and stator assembly, where the rotor assembly has a rotor shaft with an $L^3/D^4$ ratio of less than 50, and an isolating can separating the rotor assembly and the stator assembly.

Another embodiment provides a canned motor comprising a rotor assembly including a rotor shaft having a first and second end and a stator assembly. An isolating can separates the rotor assembly and the stator assembly. A first frictionless bearing is positioned on the first shaft end and the first frictionless bearing is configured to resist longitudinal displacement of the rotor within the motor by an axial shaft load, in at least one axial direction. A second frictionless bearing is positioned on the second shaft end and configured to allow limited longitudinal displacement of the rotor assembly within this bearing as from thermal expansion or lengthwise adjustment or from pressure from an axial shaft load.

Yet another embodiment provides a rotor assembly, which can be operated either horizontally or vertically, that includes a rotor shaft having a first and second end coaxially extended through a hollow shaft having a first and second end, and a stator assembly. The rotor windings are mounted on the hollow shaft. A first frictionless bearing is positioned on the first shaft end of the hollow shaft. A second frictionless bearing is mounted coaxially on a sleeve coaxially mounted on the second shaft end. A cap and nut assembly mounted to the sleeve provide for adjustable axial positioning of the rotor shaft within the hollow shaft, or for replacement of the rotor shaft within the hollow shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

The invention is susceptible of many embodiments. What follows are merely preferred embodiments, and should not be construed as limiting of the scope of the invention.

Figure 1:
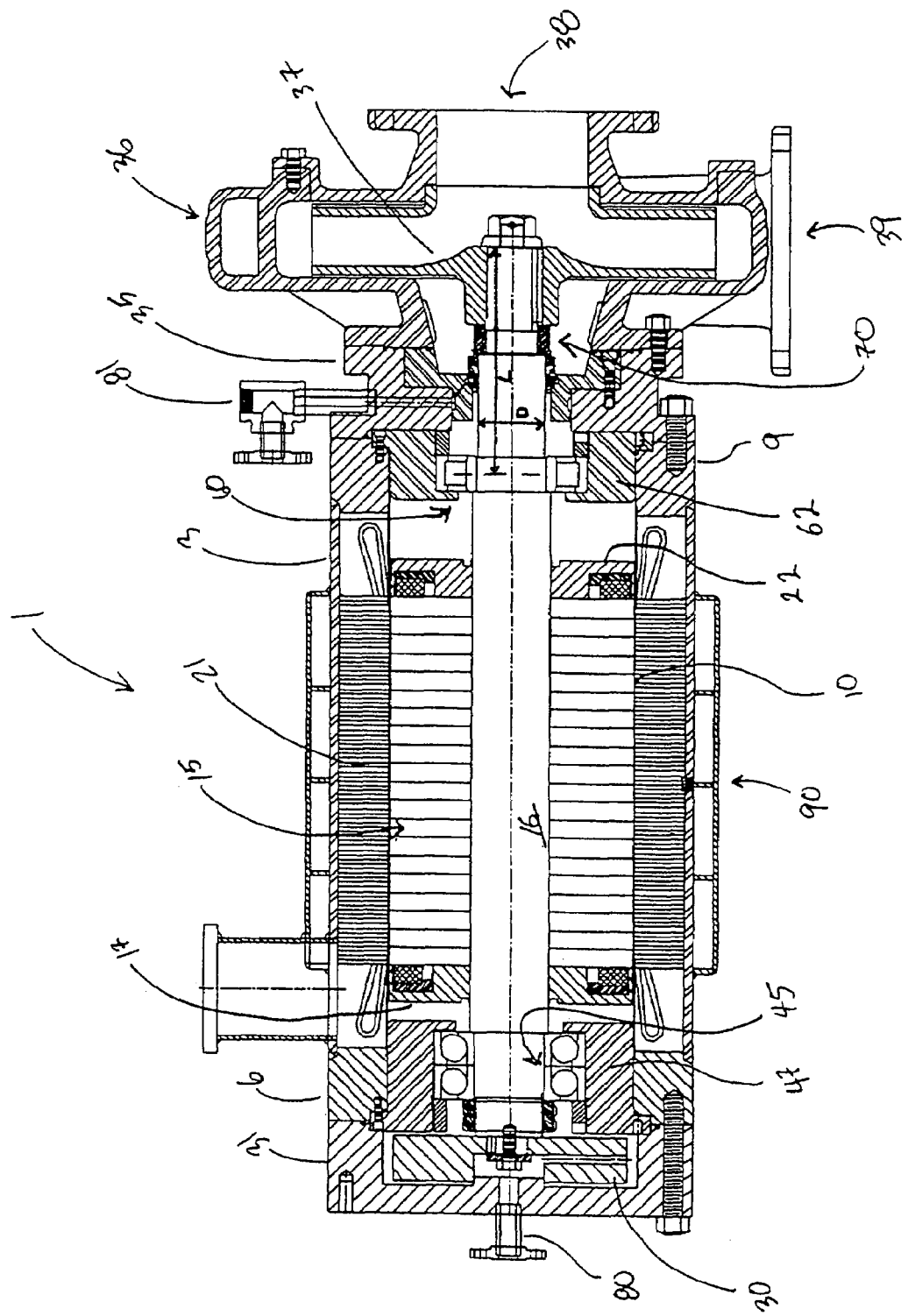
FIG. 1 is cross-sectional view of the canned motor of one embodiment of the present invention with a pump connected thereto.
Figure 2:
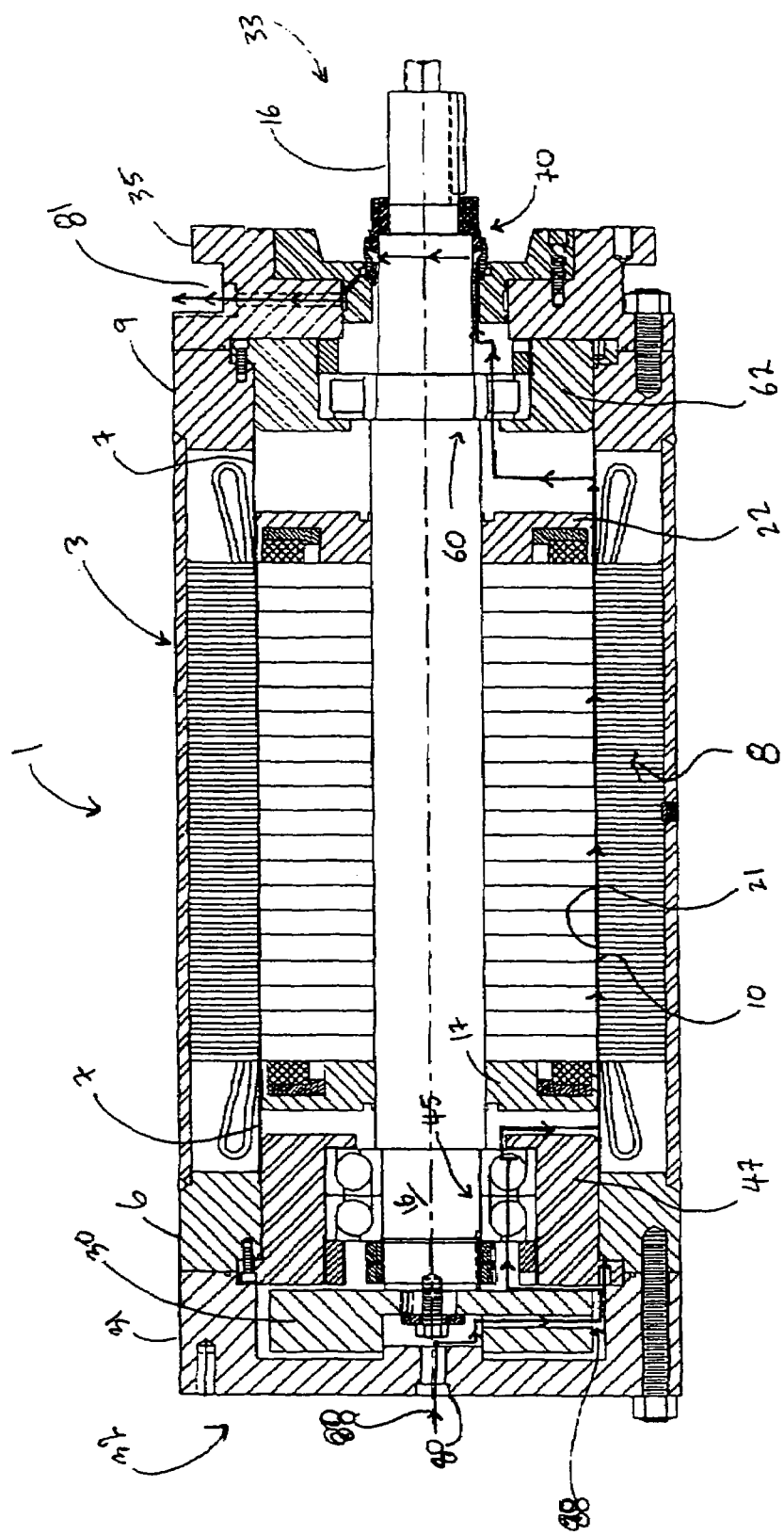
FIG. 2 is cross-sectional view of the canned motor of the embodiment of FIG. 1.
Figure 3:
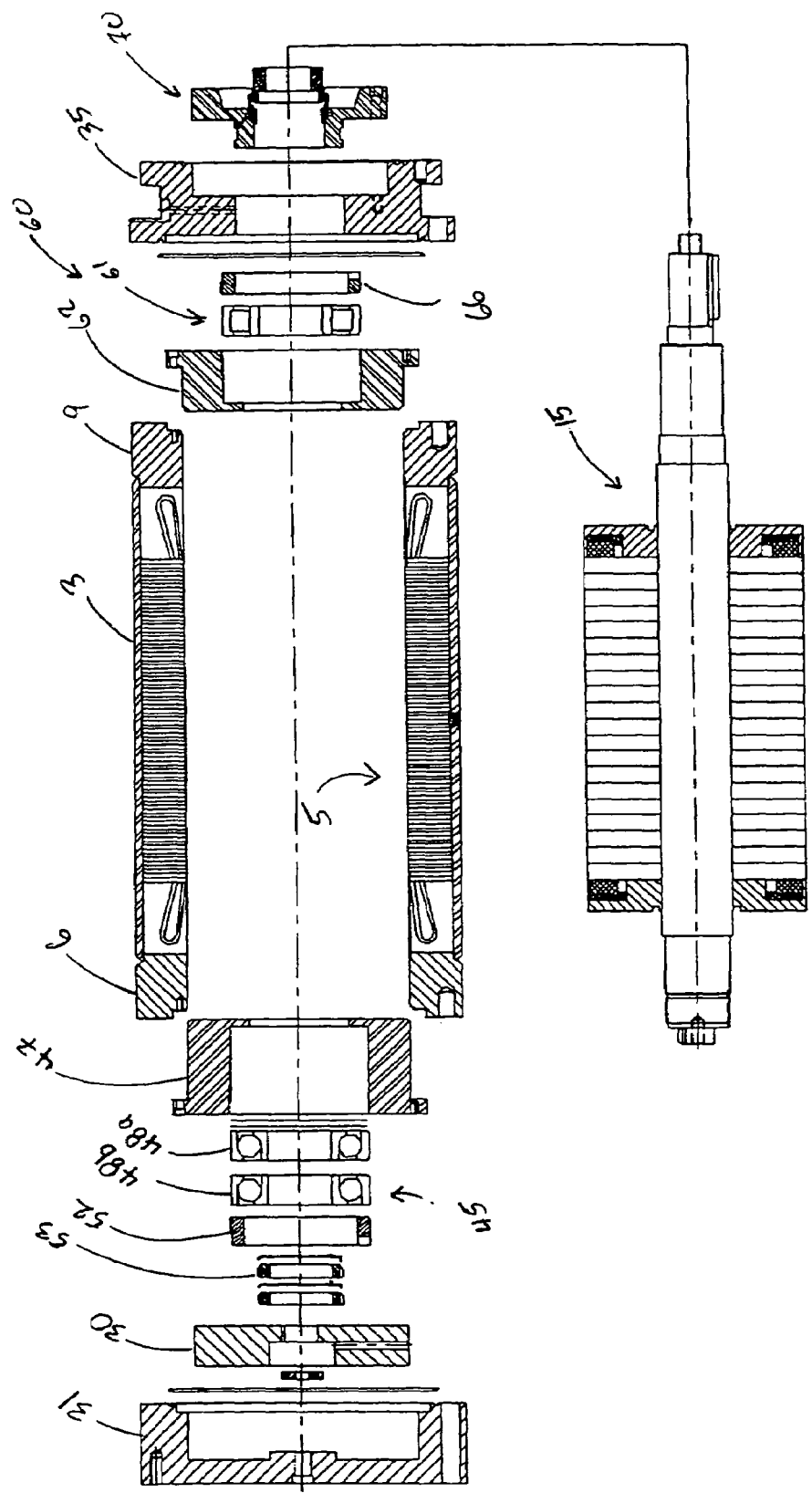
FIG. 3 is an exploded cross-sectional view of the canned motor of the embodiment of FIG. 1.

FIG. 1 is an assembled cross-sectional view of the canned motor 1 of the present invention as it is employed with a standard pump. Thus, in addition to canned motor 1, FIG. 1 illustrates a pump housing 36 with an inlet 38, outlet 39, and pump impeller 37. FIG. 2 illustrates canned motor 1 with pump housing 36 and impeller 37 removed while FIG. 3 shows an exploded view of canned motor 1. Canned motor 1 includes a housing 3 with the motor having an inboard end 33 and an outboard end 32. Beginning at inboard end 33, the main components of motor 1 include mechanical seal 70 through which the end of rotor shaft 16 extends. Mechanical seal 70 engages adapter plate 35 whose outer face is designed to mate with the particular pump housing to be connected to canned motor 1. Positioned behind adapter plate 35 is inboard bearing housing 62 which forms part of inboard bearing assembly 60. Inboard bearing assembly 60 is explained in more detail below in relation to FIG. 6.

Figure 4:
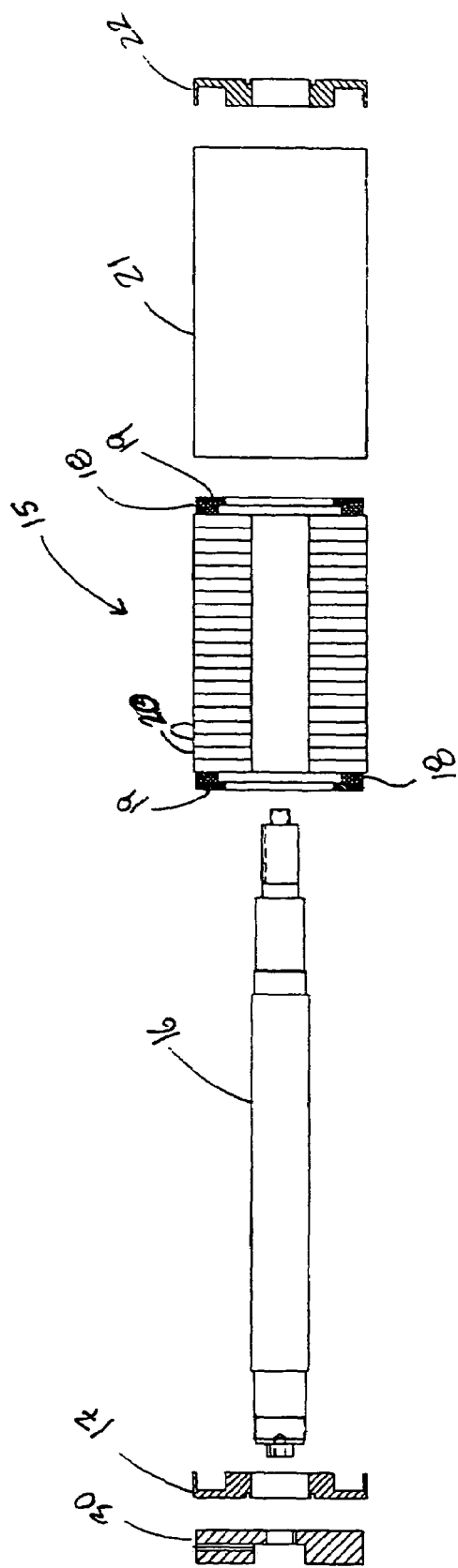
FIG. 4 is an exploded cross-sectional view of the rotor assembly of the embodiment of FIG. 1.

Turning to the outboard end 32 of canned motor 1, rear motor cover 31 houses an auxiliary impeller 30 which is connected to the end of rotor shaft 16. Behind auxiliary impeller 30 is outboard bearing assembly 45 which includes bearing housing 47 and which is also explained below in greater detail. FIG. 3 best illustrates the two main sub-components of canned motor 1, stator assembly 5 and rotor assembly 15. An exploded view of rotor assembly 15 in FIG. 4 shows rotor shaft 16, rotor bars 18 surrounded by laminations 20 and short-out rings 19 on each end of rotor bars 18. As with conventional electric motors, rotor bars 18 form the "poles" of the rotor and short-out ring 19 electrically connects the rotor bars 18 on each of their ends. However, unlike conventional canned motors, motor 1 has a sufficient number of poles for the motor to operate at lower speeds such as 1200, 900, or 600 rpm. The motor speed may be even lower for certain applications, such as a 200 rpm speed for mixing devices.

As is well known, the speed of motor 1 is governed by 7200 divided by the number of poles. Thus, a 1200 rpm motor requires 6 poles, a 900 rpm motor requires 8 poles, and a 600 rpm motor requires 12 poles, etc. In a preferred embodiment, motor 1 has at least 6 poles. However, motor 1 could be provided with 4 or even 2 poles. FIG. 4 also shows the rotor can 21 which is a hollow cylinder formed from $15/1000$ to $20/1000$ inch 316 or 304 stainless steel sheeting material with a diameter sufficient to slide over laminations 20. Other suitable materials may be used to form rotor can 21 depending on the particular application. Rotor can 21 is secured in place by welding outboard rotor plate 17 and inboard rotor plate 22 to their respective ends of rotor can 21.

Figure 5:
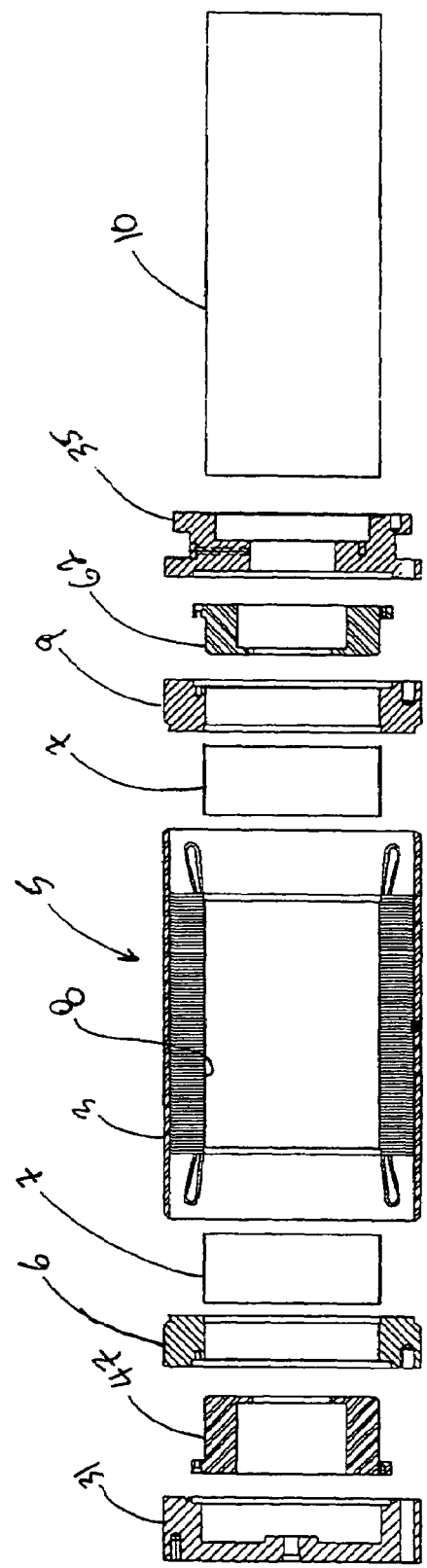
FIG. 5 is an exploded cross-sectional view of the stator assembly bearing embodiment of FIG. 1.

FIG. 5 illustrates an exploded view of stator assembly 5. Within motor housing 3 is positioned a series of stator windings 8 as is typical for conventional electrical motors. A stator can 10 formed of a material similar to rotor can 21 fits against the inside diameter of stator windings 8. On each end of stator windings 8, there are also backup rings 7. Backup rings 7 are cylinders of a slightly larger diameter than stator can 10 such that backup rings 7 may slide over the ends of stator can 10 but still maintain a close fit with stator can 10. Backup rings 7 are generally formed of a thicker sheeting material than stator can 10, for example a sheeting at least $^{40}/_{1000}$ inch thick. However, backup rings 7 may often be thicker depending upon the particular application. FIG. 2 best shows how inboard stator plate 9 and outboard stator plate 6 are connected to housing 3. It can also be seen that backup rings 7 extend somewhat past and beneath both the stator plates 6 and 9 and stator windings 8. Because of the gap formed between the end of stator windings 8 and stator plates 6 and 9 and the pressure of the cooling fluid (discussed below), it is useful to employ the thicker, structurally more rigid backup rings 7 than to rely solely on the thinner stator can 10 along this gap between the stator windings and stator plates. The electrical connections to stator windings 8 communicate through housing 3 by way of the conventional terminal gland 85 seen in FIG. 1.

Figure 6:
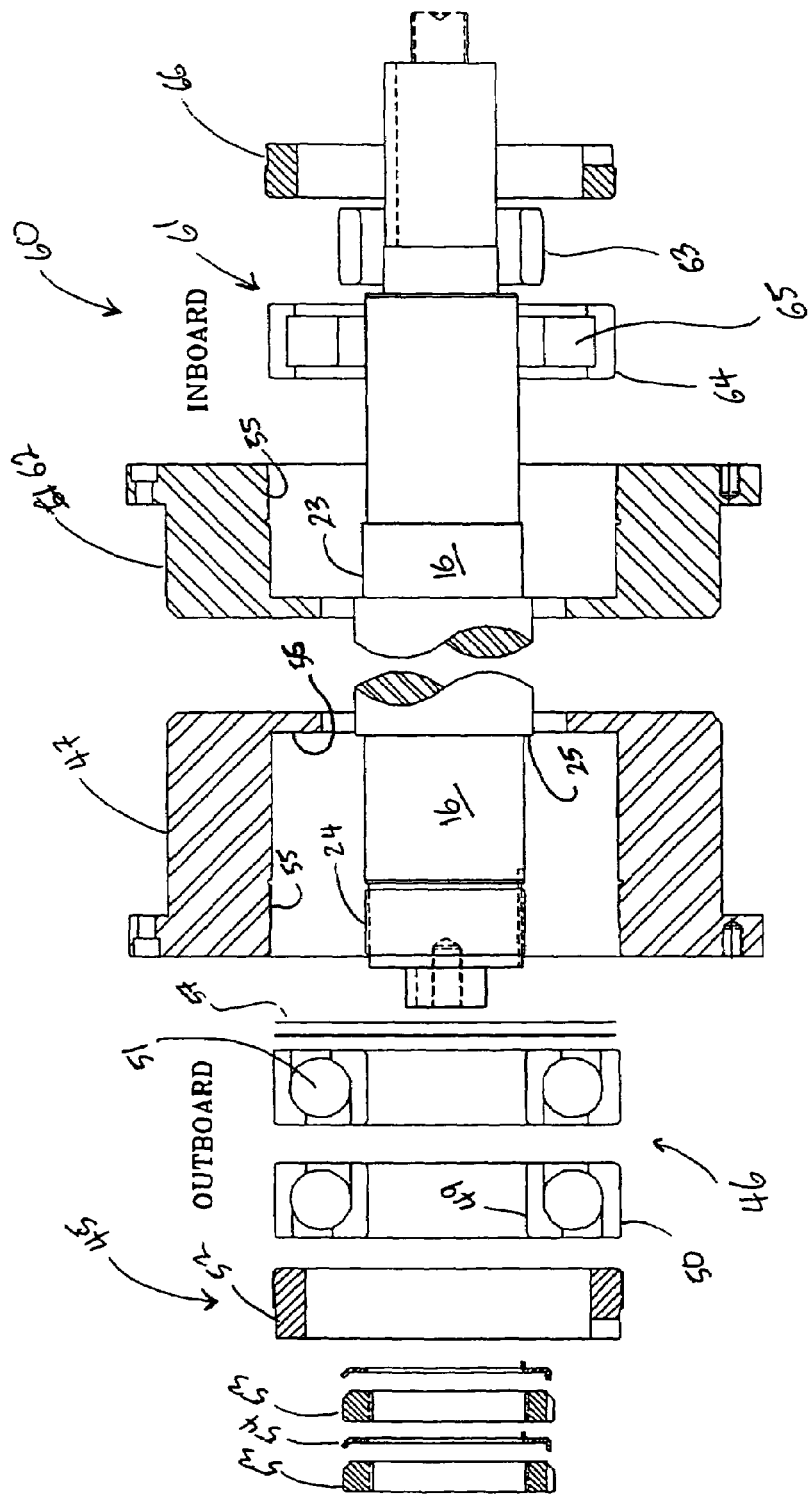
FIG. 6 is an exploded cross-sectional view of the frictionless bearings employed by the embodiment of FIG. 1.

As seen in FIG. 2, there is a bearing assembly 60 on inboard end 33 of motor 1 and a bearing assembly 45 on outboard end 32. FIG. 6 provides an exploded view of both bearing assemblies with the end portions of rotor shaft 16 included for reference. Both bearing assemblies 45 and 60 are "frictionless" bearings. Frictionless bearings normally include a freely moving or rolling component (e.g. a series of balls or cylinders) between two races or other confinement structure. Frictionless bearings may be distinguished from friction bearings (e.g. sleeve bearings) where two moving surfaces directly contact and wear against one another. Examples of frictionless bearings include conventional metal ball bearings, ceramic ball bearings, cylindrical roller bearings, angular contract bearings, double row bearings, needle bearings, taper (or cup and cone) bearings, magnetic bearings and others.

In the embodiment shown in FIG. 6, the outboard bearing assembly 45 is formed by two angular contact bearings 46, such as those designated SKF-7320 40☐BEGAM angular contact bearings and available from any standard bearing supply house such as Allied Bearing of Baton Rouge, La. Each angular contact bearing 46 consists of an inner race 49, an outer race 50, and a series of ball bearings 51. The two angular contact bearings 46 are positioned within bearing housing 47 and secured there by outer race lock-nut 52 engaging housing threads 55 and inner race lock-nuts 53 and lock washers 54 engaging shaft threads 24. Typically, about 0.05" of shims 57 are positioned within the bearing housing 47 to ensure proper positioning of the (pump) impeller.

Comparing FIGS. 2 and 6, it will be apparent how this bearing arrangement resists axial shaft loads and prevents axial movement of rotor shaft 16 (with "axial" being in the direction along the length of shaft 16) toward either the inboard or outboard end of motor 1. Rotor shaft 16 is restrained from moving toward the outboard end of motor 1 because shoulder 25 of rotor shaft 16 abuts against bearings 46 which are in turn held in bearing housing 47 by outer race lock-nut 52. Rotor shaft 16 is restrained from moving toward the inboard end of motor 1 because inner race lock-nut 53 on rotor shaft 16 abuts against bearings 46 which are in turn held against inboard movement by rear wall 56 of bearing housing 47. The two angular contact beings 46 are shown positioned in a back-to-back arrangement, but could also be positioned in a face-to-face arrangement.

As mentioned above, prior art thrust bearings have a comparatively limited thrust capacity. A significant advantage of the bearings 46 shown in the figures is that for a 50 or 75 horsepower canned motor pump, the thrust capacity of 50,000 to 60,000 lbs. may be achieved as opposed to the 1100 lbs. thrust capacity of conventional thrust bearings used in prior art canned motors. In prior art canned motors, careful attention had to be given to certain pump operating characteristics such as maintaining a hydraulic balance across the impeller since impeller hydraulic imbalances created thrust on the bearings and possibly threatened to exceed the 1100 lbs. capacity. However, where the present invention can provide a thrust capacity up to approximately 50 times that of the prior art, hydraulic balance of the impeller becomes a significantly less important condition and pumps may be operated under a wider range of circumstances. Additionally, the angular contact bearings 46 have a radial load capacity of up to approximately 70,000 lbs. as opposed to the 2000 to 3000 lbs. capacity of the sleeve bearing described above.

In the embodiment shown in the figures, the bearing assembly 60 on the inboard end of motor 1 may consist of a cylindrical roller bearing 61, such as those designated SKF NU-320 cylindrical roller bearings and available from Allied Bearing of Baton Rouge, La. Cylindrical roller bearing 61 may include an outer race 64, and inner race 63 and a series of cylindrical rollers 65. Inner race 63 is press fitted onto shoulder section 23 of rotor shaft 16 while outer race 64 and cylindrical rollers 65 are positioned over inner race 63. Outer race 64 is fixed within bearing housing 62 by way of outer race lock-nut 66 engaging housing threads 55. An important distinction between the arrangement of cylindrical roller bearing 61 and the two angular contact bearings 46 is that the former will allow some axial movement of rotor shaft 16. Thus, if there is a slight thermal expansion of rotor shaft 16, the shaft and the cylindrical rollers 65 may move toward the inboard end of motor 1. Additionally, the cylindrical roller bearings 65 have a radial load capacity of approximately 70,000 lbs. as opposed to the 2000 to 3000 lbs. capacity of the sleeve bearing described above.

Referring to FIG. 1, there is shown the length "L" between the mid-point of cylindrical roller bearing 61 and the hub of impeller 37 as well as the diameter "D" of rotor shaft 16. These dimensions are the basis for determining the $L^3/D^4$ ratio. For the purposes of the present invention, the $L^3/D^4$ ratio should be less than 50 and in a preferred embodiment less than 10, and in a still more preferred embodiment, less than 6. The greater the $L^3/D^4$ ratio, the greater tendency rotor shaft 16 has to deflect from its intended centerline. This rotor shaft deflection has a seriously detrimental effect on the efficiency and longevity of bearings and seals positioned along the rotor shaft. Since certain adverse operating conditions such as pump cavitations, closed suction or discharge valves, or improper operating conditions, i.e. poor pump selection, are relatively common to the pump environment and result in shaft deflection, the shorter $L^3/D^4$ ratio of the present invention will have a significant advantage in extending the useful life of bearings and seals.

The flow of cooling and lubricating fluid through canned motor 1 is illustrated in FIG. 2. The cooling fluid 88 may either be taken directly from the process stream being pumped, run through motor 1 and returned to the process stream, or a separate source of cooling fluid may used and circulated separate of the process stream. Cooling fluid 88 is drawn into motor 1 through inlet 80 by auxiliary impeller 30. Auxiliary impeller 30 is attached to rotor shaft 16 and will move cooling fluid 88 through motor 1 as long as motor 1 is in operation. Cooling fluid 88 then flows across bearings 46 lubricating and cooling these bearings. Cooling fluid 88 then flows across bearings 46 lubricating and cooling these bearings. Cooling fluid 88 passes between bearing housing 47 and stator plate 17 in order to enter the gap (not shown) formed between stator can 10 and rotor can 21. It is because of the pressure of cooling fluid 88 at this point that it is necessary to utilize back-up rings 7 described above to strengthen the stator can 10 across the air gap left between stator plate 6 and rotor windings 8. As cooling fluid 88 flows between the rotor and stator cans, it will transfer heat from the stator and rotor. Cooling fluid will then flow between the rotor plate 22 and bearing housing 62 on the inboard end before flowing over bearing assembly 60.

Figure 7:
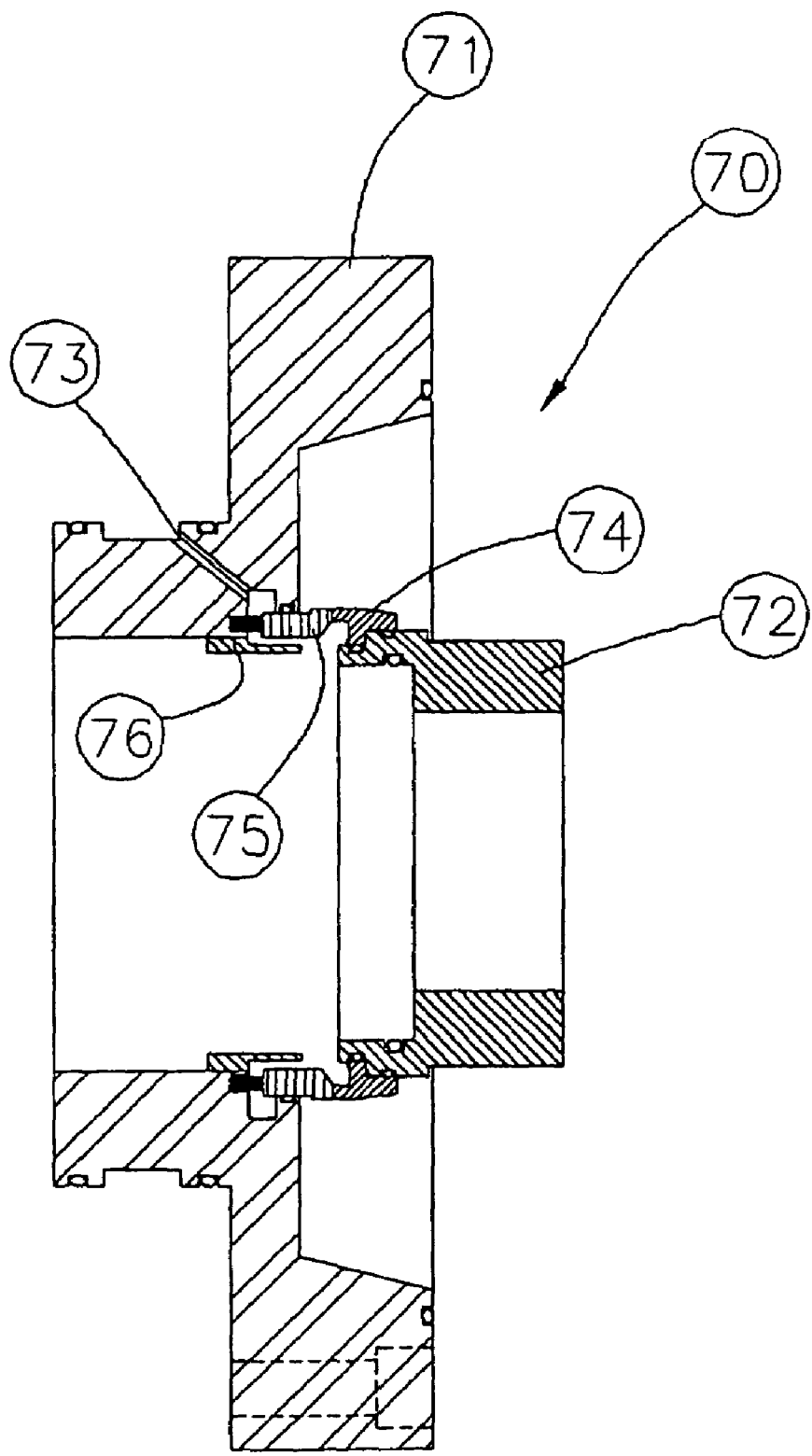
FIG. 7 is cross-sectional view of the mechanical seal employed by the embodiment of FIG. 1.

Since the embodiment shown in the figures contemplates circulating cooling fluid 88 separate from the process fluid being pumped, the cooling fluid 88 will be directed to a cooling fluid outlet 81 and kept separate from the process fluid by mechanical seal 70. Mechanical seal 70 is best seen in FIG. 7 and in the embodiment shown, comprises a seal model no. SLM6200 available from Flowserve of Baton Rouge, La. Seal gland 71 forms the housing for mechanical seal 70. The drive collar for the rotating face of the seal is formed by hook sleeve 72. A plurality of return ports 73 form the return passage for the cooling fluid being pumped through motor 1. Rotating face 74 is attached to hook sleeve 72 while stationary face 75 provides the sealing surface for the seal. A diversion ring or baffle 76 channels the fluid from the outside diameter of the shaft to the seal faces through ports 73 and out of the adapter plate 35 via outlet 81 (see FIG. 1).

Figure 8:
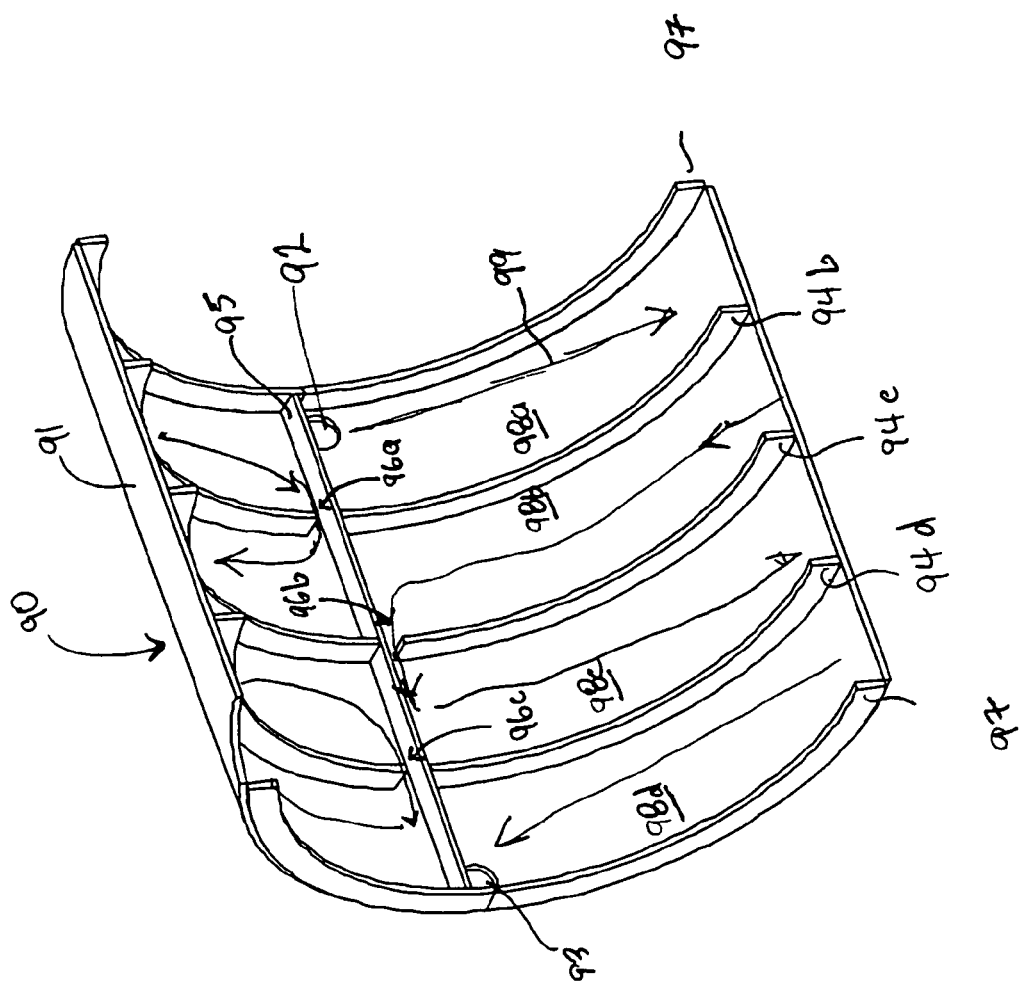
FIG. 8 is a cut-away perspective view of the interior of the cooling jacket used in the embodiment of FIG. 1.

FIG. 1 also shows a cooling jacket 90 around the housing 3 of motor 1. A cross-section of the internal surface of cooling jacket 90 is seen in FIG. 8. Cooling jacket 90 includes an annular jacket body 91 and end walls 97 which wrap around motor housing 3 to form a water-tight seal. The inside surface of annular body 91 has a plurality of annular internal dividing walls 94. Annular dividing walls 94 form a series of circular channels which run around the circumference of housing 3 within jacket body 91. A fluid inlet 92 is formed on one end of jacket body 91 and a fluid outlet 93 on the opposite end. A longitudinal dividing wall 95 runs between the two end walls 97 and intersects the annular dividing walls 94. Fluid communication between adjacent channels 98 is accomplished by way of cross-over passages 96 which are formed by a break in annular dividing walls 94 adjacent to longitudinal dividing wall 95. However, the location of cross-over passages 96 alternates above and below longitudinal dividing wall 95. For example, cross-over passage 96a is shown positioned above longitudinal dividing wall 95 while cross-over passage 96b is below longitudinal dividing wall 95 and cross-over passage 96c is above longitudinal dividing wall 95. As suggested by fluid flow arrows 99, cooling fluid enters cooling jacket 90 through inlet 92 and is forced to flow in channel 98a away from longitudinal dividing wall 95. Cooling fluid 99 travels around the channel 98a until encountering the top side of longitudinal dividing wall 95. At this point, cooling fluid 99 may enter channel 98b through cross-over passage 96a. However, because cross-over passage 98b is on the opposite side of longitudinal dividing 95, cooling fluid 99 cannot directly enter channel 98c. Rather, cooling fluid 99 must travel completely around channel 98b to reach the bottom side of longitudinal dividing wall 95 and the cross-over passage 96b. In this manner, cooling fluid 99 is forced to follow a spiral-like path along the entire length of channels 98a-98d before exiting outlet 93. This ensures the cooling fluid has extended contact time with motor housing 3 and can transfer more heat away form housing 3.

Figure 9:
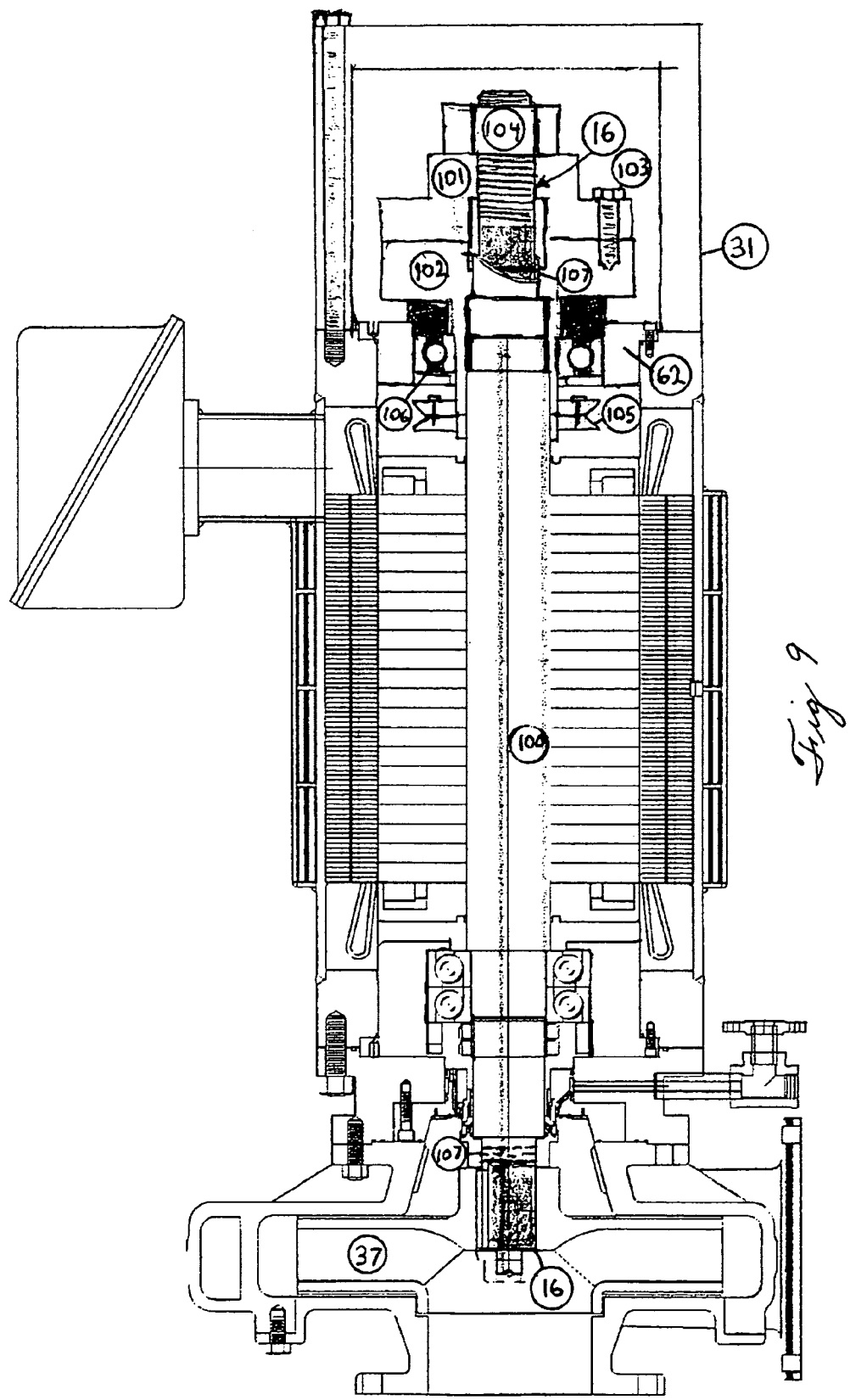
FIG. 9 is a cross-sectional view of a canned motor and pump assembly of the present invention depicting a preferred embodiment having a hollow shaft and axially adjustable rotor.

FIG. 9 shows another embodiment of the present invention whereby the rotor shaft 16, to which is attached impeller 37, extends coaxially through hollow drive shaft 100. Adjustable cap 101 is threaded onto the outboard end of shaft 16 and then secured to sleeve 102 with fasteners 103. Lock nut 104 secures shaft 16 from unplanned rotation within adjustable cap 101. Sleeve 102 is secured to hollow drive shaft 100 by compression clamp 105, or any other suitable or commonly known means of transmitting torque from hollow drive shaft 100 to rotor shaft 16 and transmitting axial thrust from rotor shaft 16 to hollow drive shaft 100. Bearing 106 is mounted on sleeve 102 with an interference fit. Bearing 106 can be a frictionless bearing of any type, the mounting method dependent on the bearing style as discussed in previous embodiments. In this particular example bearing 106 is used to transmit radial loads from sleeve 102 to bearing housing 62. A secondary seal 107, such as an o-ring, seals against leakage between the rotor shaft and the hollow drive shaft. Axial adjustment of rotor shaft 16 can be done by first removing rear motor cover 31. Lock nut 104 is removed from rotor shaft 16. Fasteners 103 are removed from adjustable cap 101. Adjustable cap 101 can then be threaded up or down rotor shaft 16. This will change the axial distance to the inboard end of the rotor shaft 16 relative to adjustable cap 101. Reattaching fasteners 103 to secure end cap 101 to sleeve 102 will establish the axial position of the rotor without further disassembly or reassembly required.

This is but one method of securing and adjusting the rotor shaft within a hollow shaft; numerous and other variations and embodiments will be apparent to those skilled in the art from this description. Moreover, the limitations of the preferred methodology described herein should not detract from the full scope of the innovation of introducing a hollow shaft configuration for adjustment of axial clearance within a canned motor pump.

In the same manner, the rotor shaft 16 can be completely removed from hollow drive shaft 100 once the impeller 37 is removed from rotor shaft 16. In this way a damaged rotor shaft 16 can be replaced without the expense of replacing the rotor core, rotor can, or bearings.

Although certain preferred embodiments have been described above, it will be appreciated by those skilled in the art to which the present invention pertains that modifications, changes, and improvements may be made without departing from the scope and spirit of the invention as defined by the appended claims.

For example, there is a canned motor for a pump assembly consisting of a rotor assembly, a stator assembly, and an isolating can separating the rotor assembly and stator assembly. The rotor assembly has a rotor shaft with a first shaft end and an extending second shaft end. There is a first frictionless bearing on the first shaft end, and a second frictionless bearing on the second shaft end. There is a mechanical seal on the second shaft end positioned outboard of the second frictionless bearing and sealing the second shaft end in a pump housing.

The first frictionless bearing may be configured to resist an axial shaft load in at least one axial direction. The second frictionless bearing may be configured to pass an axial shaft load. The rotor shaft may have a $L^3/D^4$ ratio of less than 50. The isolating can may further consist of a rotor can positioned within a stator can. The rotor assembly has at least 2 poles and may have 8 or 12 poles or more.

As another example, there is a canned motor consisting of a stator assembly, a rotor assembly having a rotor shaft with a L3/D4 ratio of less than 50, and an isolating can separating the rotor assembly and stator assembly. The L3/D4 ratio may be less than 10. The rotor assembly may have a rotor shaft with a first shaft end and a second shaft end, with a first frictionless bearing on the first shaft end, and a second frictionless bearing on the second shaft end.

As yet another example, there may be a canned motor for a pump assembly consisting of a rotor assembly including a rotor shaft having a first and second end, a stator assembly, with an isolating can separating the rotor assembly and the stator assembly. There is a first frictionless bearing position on the first shaft end, where the first frictionless bearing is configured to resist an axial shaft load in at least one axial direction. There is a second frictionless bearing positioned on the second shaft end, where the second frictionless bearing is configured to allow axial shaft movement in response to an axial shaft load. There is also a mechanical seal on the second shaft end outboard of the second frictionless bearing which seals the second shaft end within a pump bearing housing.

The first frictionless bearing may be configured to resist an axial shaft load in both axial directions. The second frictionless bearing may be a cylindrical roller bearing. Each of the frictionless bearings may be a type of bearing from among a group of bearing types consisting of a conventional metal ball bearing, a ceramic ball bearing, a cylindrical roller bearing, an angular contact bearing, a double row bearing, a needle bearing, a tapered (cup and cone) bearing, and a magnetic bearing. The $L^3/D^4$ ratio of the canned motor may be less than 50. It may be less than 10 or even less than 6.

As still yet another example, there is a canned motor for a pump assembly consisting of a rotor assembly having a hollow shaft upon which rotor windings are configured, where the hollow shaft has a first hollow shaft end and a second hollow shaft end, and a rotor shaft with a first shaft end and an extending second shaft end, where the rotor shaft is non-rotatingly coupled to the hollow shaft. There is a first frictionless bearing on the first hollow shaft end, a second frictionless bearing on the second shaft hollow end, and a mechanical seal on the second hollow shaft end positioned outboard of the second frictionless bearing so as to be sealing the second hollow shaft end in a pump housing. There is also a stator assembly, with an isolating can separating the rotor assembly and the stator assembly.

As in other embodiments, the frictionless bearings may be any of a conventional metal ball bearing, a ceramic ball bearing, a cylindrical roller bearing, an angular contact bearing, a double row bearing, a needle bearing, a tapered bearing, and a magnetic bearing. the $L^3/D^4$ of the rotor shaft may be less than 50. The motor being operable in either of horizontal and vertical orientations, it may be further configured such that the first frictionless bearing resists axial displacement of the rotor assembly in at least one axial direction within the canned motor, and the second frictionless bearing allows axial displacement of the rotor assembly within the canned motor. It may be further configured with an adjustable means for axially positioning the rotor shaft within the hollow shaft. The adjustable means may consist of a cap and nut assembly mounted to a sleeve attached to the second shaft end of the hollow shaft, by which one end of the rotor shaft is coupled to the hollow shaft.

The above examples, in addition to the description and figures provided, are intended to illustrate and not limit the scope of the appended claims.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A canned motor for a pump assembly comprising:
   a rotor assembly consisting of:
   (i.) a hollow shaft with a bore extending therethough and upon which rotor windings are configured, said hollow shaft having a first hollow shaft end and a second hollow shaft end with a first frictionless bearing on said first hollow shaft end, a second frictionless bearing on said second hollow shaft end, and a mechanical seal on said second hollow shaft end positioned outboard of said second frictionless bearing and sealing said second hollow shaft end in a pump housing; and
   (ii.) a rotor shaft with a first shaft end and an extending second shaft end, said rotor shaft extending coaxially through and being non-rotatingly coupled to and removable from said hollow shaft without further disassembling said motor;
   a stator assembly; and
   an isolating can separating said rotor assembly and said stator assembly.

2. A canned motor according to claim 1, wherein each said frictionless bearing comprises a bearing from a group of bearings consisting of a conventional metal ball bearing, ceramic ball bearing, cylindrical roller bearing, angular contact bearing, double row bearing, needle bearing, taper bearing, and magnetic bearings.

3. A canned motor of claim 1 with $L^3/D^4$ of less than 50.

4. A canned motor according to claim 1, said motor being operable in either of horizontal and vertical orientations and further comprising: said first frictionless bearing being configured to resist axial displacement of said rotor assembly in at least one axial direction within said canned motor; and said second frictionless bearing being configured to allow axial displacement of said rotor assembly within said canned motor.

5. A canned motor according to claim 4 including an adjustable means for axially positioning the rotor shaft within the hollow shaft.

6. A canned motor of claim 5 with an $L^3/D^4$ of less than 50.

7. A canned motor according to claim 5, said adjustable means for axially positioning the rotor shaft within the hollow shaft comprising a cap and nut assembly mounted to a sleeve attached to the second hollow shaft end.

8. A canned motor according to claim 1, said rotor assembly having at least two poles.

9. A canned motor according to claim 1, said rotor assembly having at least four poles.

10. A canned motor according to claim 1, said rotor assembly having at least six poles.

11. A canned motor according to claim 1, wherein said isolating can further comprises a rotor can positioned within a stator can.

12. A canned motor according to claim 1, wherein said second frictionless bearing is a cylindrical roller bearing.

13. A canned motor according to claim 1 with an $L^3/D^4$ of less than 40.

14. A canned motor according to claim 1 with an $L^3/D^4$ of less than 20.

15. A canned motor according to claim 1 with an $L^3/D^4$ of less than 6.

* * * * *